United States Patent

[11] 3,599,053

[72] Inventors Yoshio Iida
Osaka-fu;
Koreaki Nakata, Nishinomiya-shi, both of, Japan
[21] Appl. No. 873,016
[22] Filed Oct. 31, 1969
[45] Patented Aug. 10, 1971
[73] Assignee Matsushita Electric Industrial Co. Ltd.
Kadoma, Osaka, Japan
[32] Priority Nov. 5, 1968, Mar. 20, 1969
[33] Japan
[31] 43/81529 and 44/22513

[54] IMPROVED TITANIUM ALLOY CAPACITOR
4 Claims, 3 Drawing Figs.
[52] U.S. Cl. .................................................. 317/230,
29/570
[51] Int. Cl. ...................................................... H01g 9/04
[50] Field of Search............................................. 317/230,
231, 232, 233

[56] References Cited
UNITED STATES PATENTS
| | | | |
|---|---|---|---|
| 1,889,415 | 11/1932 | Mershon ...................... | 317/230 |
| 2,299,228 | 10/1942 | Gray et al. .......... ........... | 317/230 |
| 2,504,178 | 4/1950 | Burnham et al ................ | 317/230 |
| 3,166,693 | 1/1965 | Haring et al. .................. | 317/230 |
| 3,182,235 | 5/1965 | Mahler et al.................. | 317/230 |
| 3,330,999 | 7/1967 | Hellicar........................ | 317/230 |

Primary Examiner—James D. Kallam
Attorney—Wenderoth, Lind and Ponack

ABSTRACT: This invention relates to an improved electrical capacitor comprising, as an electrode, a binary alloy of titanium and aluminum or ternary alloy of titanium, zirconium and aluminum, said electrode having an anodic dielectric oxide film formed thereon. The novel capacitors have high capacitance and low leakage current at high voltages.

PATENTED AUG 1 0 1971 3,599,053

KOREAKI NAKATA and
YOSHIO IIDA, Inventors

BY Wenderoth Lind &Ponack

Attorneys

IMPROVED TITANIUM ALLOY CAPACITOR

Electrical capacitors, especially those of the electrolytic-type, commonly employ metal electrodes on which a thin dielectric oxide coating has been formed. Heretofore, aluminum and tantalum have been commonly employed as capacitor electrode materials, and while each material has been found particularly useful under certain conditions, they have certain drawbacks. Aluminum is light weight and superior in the ductility which facilitates making a thin foil. In addition, aluminum foil is easily increased in the surface area thereof by surface etching, and is less expensive than tantalum. Therefore, aluminum in a foil form has been used widely for making electrolytic capacitor in a wet-type. On the other hand, tantalum forms a dielectric oxide film thereon which is superior in the electrical properties, especially in the leakage current at high voltages and easily makes a porous body compared to aluminum. However, tantalum is more expensive than aluminum and is restricted in the application.

Titanium has also been considered heretofore for possible use as a capacitor electrode material in view of the high dielectric constant of its oxide and other good properties such as corrosion resistance and low density. However, it has been difficult to make a dielectric oxide film on the surface of titanium superior in leakage current at high voltages. Such drawback of titanium prevents a wide use for an electrode adapted to an electrolytic capacitor in spite of its high dielectric constant and good sinterability. Especially, a porous body of titanium is known to be inferior in respect of the leakage current when formed into an electrolytic capacitor of the solid type.

An object of the present invention is to provide an electrolytic capacitor characterized by a low leakage current at high voltages.

Another object of the invention is to provide a titanium alloy electrolytic capacitor of a solid type characterized by a large capacitance and a low leakage current at high voltages.

A further object of the present invention is to provide a method for making an electrolytic capacitor characterized by a low leakage current at high voltages.

These and other objects of the invention will be evident upon consideration of the following detailed description taken together with accompanying drawings wherein.

Before proceeding with the detailed description of the novel electrode and its preparation method contemplated by the invention, a construction of an electrical capacitor comprising said electrode will be described with reference to FIGS. 1 and 2 of the drawings.

Figure 1:
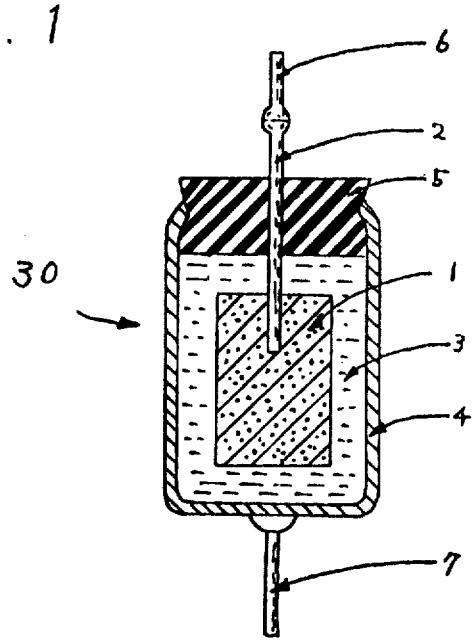
FIG. 1 is a cross-sectional view of an electrolytic capacitor of the wet-type in accordance with the invention.

Referring to FIG. 1, a reference character 30 indicates, as a whole, a wet-type electrolytic capacitor comprising a container 4 serving as the cathode and containing an electrolyte 3 in which an anode 1 is immersed. Said anode 1 consists of titanium alloy according to the invention and is formed into a desired form and is anodically oxidized in a manner illustrated in detail hereinafter. In this embodiment, said anode 1 is a sintered body of titanium alloy prepared in a manner described hereinafter. A lead wire 2 made of a film forming metal such as the same alloy as the anode, or of niobium, titanium, zirconium, tantalum or other film-forming metal, is embedded in said sintered body 1 of titanium alloy and extends to an insulating plug 5 made of any insulating and watertight material such as rubber or resin. Electric leads 6 and 7 made of any solderable metal such as copper or iron are attached to said film-forming metal lead wire 2 and said container 4 in a per se well-known method such as welding method.

Figure 2:
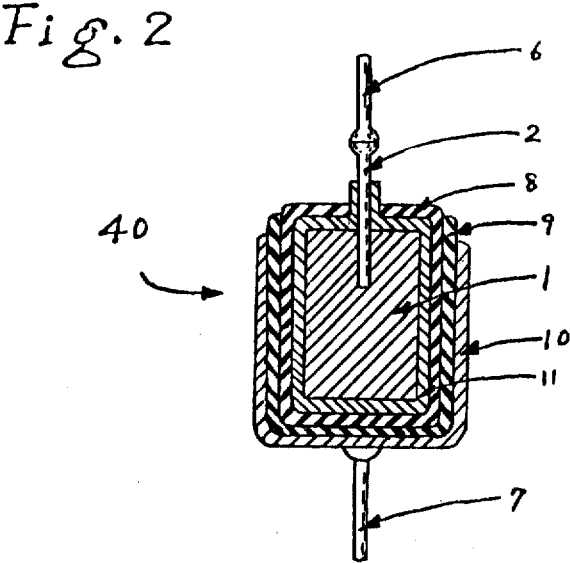
FIG. 2 is a cross-sectional view of the electrolytic capacitor of the solid type in accordance with the invention.

Referring to FIG. 2, reference character 40 indicates a base electrode 1. Said base electrode 1 may be of any form such as plate, wire or sintered form prepared in a manner illustrated hereinafter. Said sintered body 1 has a film-forming metal lead wire 2 embedded therein. Said sintered body and film-forming metal lead wire are coated with oxide film 11 by being anodically oxidized in a manner illustrated hereinafter. Said film-forming metal lead wire 2 is made of the same alloy, or of niobium, titanium, zirconium, tantalum or other film-forming metal. Said oxide film 11 is coated with a layer 8 of a semiconductive material in a per se well-known method. A carbon film layer 9 is integrated onto said layer 8 of semiconductive material by per se a conventional method such as a brushing method in which a carbon ink is applied by brushing. A silver paint 10 as counterelectrode is applied to said carbon film layer 9. Electric leads 6 and 7 made of any solderable metal such as copper and nickel are attached in per se conventional manner to said film-forming lead wire 2 and said counterelectrode 10, respectively.

It has been discovered according to the present invention that a binary alloy of titanium and aluminum and ternary alloy of titanium, zirconium and aluminum can form a dielectric oxide film having a low leakage current at high voltages when anodically oxidized.

Figure 3:
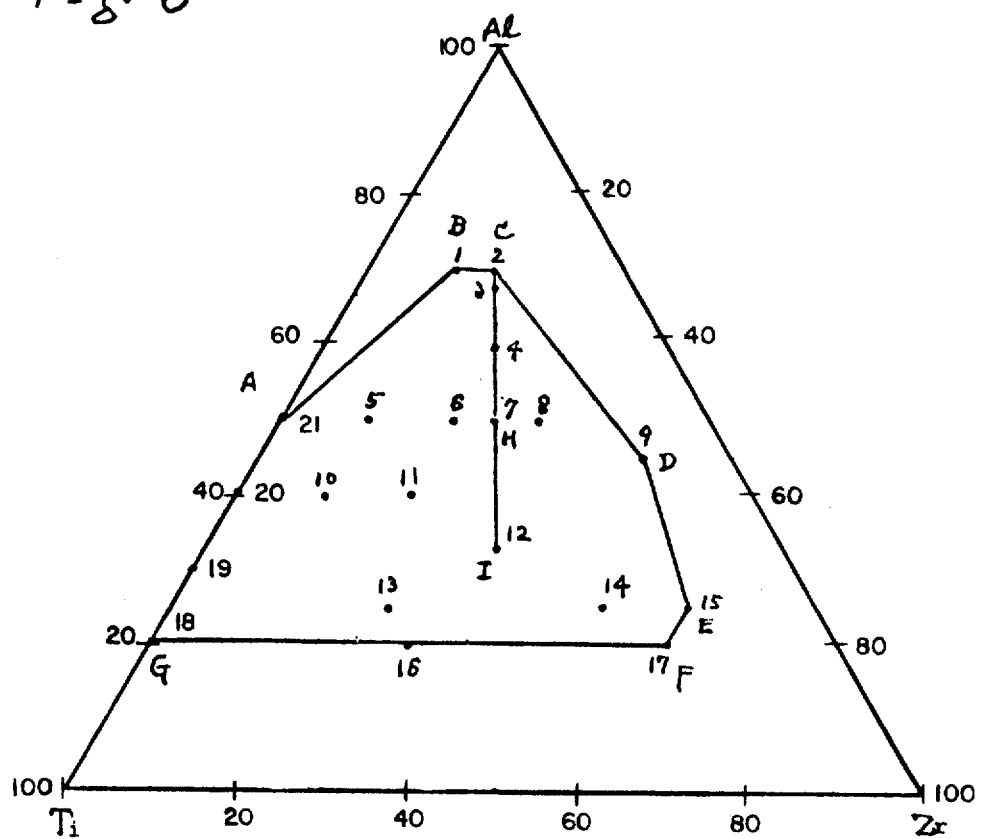
FIG. 3 is a triangular compositional diagram of electrode materials utilized in the present invention.

Operable alloy compositions consist essentially of base material selected from those defined by and included with polygonal area ABCDEFG of the diagram of FIG. 3 in accordance with the invention. Particularly, the perferable alloy compositions consist essentially of base material selected from those defined by lines connecting points CHI of the diagram of FIG. 3, in accordance with the invention.

The alloy in the preferred composition is easily crushed into fine particles which are useful for making a capacitor having a porous electrode, in accordance with the invention. The atomic percentage of the three components of compositions ABCDEFGHI are as follows in accordance with the invention.

TABLE 1

|   | Ti | Zr | Al |
|---|----|----|----|
| A | 50 | 0 | 50 |
| B | 20 | 10 | 70 |
| C | 15 | 15 | 70 |
| D | 45 | 10 | 45 |
| E | 15 | 60 | 25 |
| F | 20 | 60 | 20 |
| G | 80 | 0 | 20 |
| H | 25 | 25 | 50 |
| I | 34 | 33 | 33 |

The alloys described herein can be made in a per se conventional and suitable manner, for example, by a vacuum melting of a mixture in a given composition or by an arc melting of mixture of a given composition in argon or helium atmosphere.

Said alloy can be anodically oxidized in any aqueous solution per se well known in the art but is preferably anodically oxidized by employing a bath composition of aqueous solution containing of 0.1 to 10 percent ammonium phosphate in a monobasic form ($NH_4H_2PO_4$) or a dibasic form (($NH_4)_2HPO_4$) in accordance with the invention. Table 2 indicates the electrical properties of anodized films on the alloys according to the invention which are obtained by arc melting method in an argon atmosphere. So-produced alloys in a shape of button are sliced into plates. The alloy plates are polished electrochemically and are anodically oxidized in a bath composition of 10 percent by weight of ammonium phosphate in a dibasic form at a direct current voltage of 60 v. for 20 minutes. Capacitance and dissipation factor are measured at 120 Hz., employing a capacitance bridge. Leakage current is measured by immersing the anodically oxidized alloy into an aqueous solution of 10 percent by weight of ammonium phosphate in a dibasic form after application of a direct current voltage as large as two thirds of the formation voltage for about 2 minutes. The term "leakage factor" is expressed by leakage current divided by the capacitance and the measuring voltage.

TABLE 2

| Example Number | Composition (at. percent) | | | Capacitance ($\mu f./cm.^2$) | D.F. (percent) | Leakage factor ($\mu a./\mu f.\cdot v.$) |
| --- | --- | --- | --- | --- | --- | --- |
| | Ti | Zr | Al | | | |
| 1 | 10 | 45 | 45 | 0.13 | 3.5 | 0.088 |
| 2 | 15 | 15 | 70 | 0.13 | 3.9 | 0.098 |
| 3 | 16 | 16 | 68 | 0.15 | 3.2 | 0.018 |
| 4 | 20 | 20 | 60 | 0.17 | 0.96 | 0.013 |
| 5 | 40 | 10 | 50 | 0.17 | 1.5 | 0.011 |
| 6 | 30 | 20 | 50 | 0.15 | 1.2 | 0.0023 |
| 7 | 25 | 25 | 50 | 0.14 | 1.4 | 0.0011 |
| 8 | 20 | 30 | 50 | 0.14 | 0.74 | 0.0030 |
| 9 | 45 | 10 | 45 | 0.16 | 2.3 | 0.040 |
| 10 | 50 | 10 | 40 | 0.16 | 2.5 | 0.035 |
| 11 | 40 | 20 | 40 | 0.16 | 2.0 | 0.040 |
| 12 | 34 | 33 | 33 | 0.16 | 1.5 | 0.0043 |
| 13 | 50 | 25 | 25 | 0.16 | 1.1 | 0.035 |
| 14 | 25 | 50 | 25 | 0.15 | 1.3 | 0.0045 |
| 15 | 15 | 60 | 25 | 0.16 | 1.5 | 0.0058 |
| 16 | 50 | 30 | 20 | 0.15 | 1.3 | 0.0024 |
| 17 | 20 | 60 | 20 | 0.15 | 1.1 | 0.0018 |
| 18 | 80 | 0 | 20 | 0.16 | 0.75 | 0.0033 |
| 19 | 70 | 0 | 30 | 0.15 | 0.83 | 0.0093 |
| 20 | 60 | 0 | 40 | 0.15 | 2.8 | 0.016 |
| 21 | 50 | 0 | 50 | 0.14 | 1.2 | 0.043 |

A porous sintered body of titanium-aluminum alloy or titanium-zirconium-aluminum alloy can be made by sintering a compacted titanium-aluminum alloy powder or a compacted titanium-zirconium-aluminum alloy powder at a temperature of 800 to 1300° C. in a nonoxidizing atmosphere. The powder of titanium-aluminum alloy or titanium-zirconium-aluminum alloy according to the invention is obtained by the process known in the titanium or zirconium powder preparation.

The titanium-aluminum alloy or the titanium-zirconium-aluminum alloy is converted into a brittle hydride compound by heating at a temperature of about 500° C. in an atmosphere of hydrogen. The hydride compound is crushed into fine particles by a ball mill or another powdering apparatus. Said hydride compound is dehydrogenated by heating in an evacuated furnace tube at about 600° C.

Both titanium-aluminum binary alloys containing 50 to 75 at. percent aluminum and titanium-zirconium-aluminum ternary alloys which consist essentially of base material selected from those defined by lines connecting points CHI of the diagram of FIG. 3, are very brittle themselves. Therefore, the alloys in the composition range described above are easily crushed without the hydride-crush-dehydride process. A porous body of titanium-aluminum alloy in the composition according to this invention can be also made by sintering a compacted mixture of titanium powder and titanium-aluminum alloy powder containing 50 to 75 at. percent aluminum.

Mixtures of titanium particles and titanium-aluminum alloy (TiAl$_3$) particles in composition listed in Table 3 are pressed at about 1850 kg./cm.$^2$ into a tablet of 3 mm. diameter and about 3 mm. height. The particle sizes of used particles are smaller than 75$\mu$. The pressed tablet is provided with a film-forming lead wire made of niobium and is heated at a temperature of 1150° C. in a reducing pressure of 10$^{15}$ mm. Hg. of air for 20 minutes. The sintered body has a porosity of about 30 percent and is anodically oxidized in a 1 percent NH$_4$H$_2$PO$_4$ aqueous solution of 25° C. at a voltage of 60 volts for 60 minutes. No pretreatment is employed.

An example of electrical properties of anodic oxide films on the porous sintered bodies mentioned above are listed in Table 3. The electrical properties are measured in a 10 percent NH$_4$H$_2$PO$_4$ aqueous solution in a way similar to that described above.

The sintered body has a porosity of about 30 percent and oxidized in electrolytes at various temperatures and in various concentrations listed in Table 4 at a voltage of 60 volts for 60 minutes. No pretreatment is employed.

An example of electrical properties of anodic oxide films on the porous sintered bodies are listed in Table 4. The electrical properties are measured in a similar manner described above.

TABLE 4

| No. | Alloy composition (at. percent) | | | Sintering temp. (° C.) | Bath temp. (° C.) | Anodizing electrolyte | Capacitance | | D.F. (percent) | Leakage factor at 40 v. ($\mu a./\mu f.\cdot v.$) |
| --- | --- | --- | --- | --- | --- | --- | --- | --- | --- | --- |
| | Ti | Zr | Al | | | | $\mu f.$ | $\mu f./cm.^3$ | | |
| 1 | 25 | 25 | 50 | 1,250 | 95 | 0.1% NH$_4$H$_2$PO$_4$ | 4.05 | 196 | 19.2 | 0.0020 |
| 2 | 25 | 25 | 50 | 1,250 | 25 | 1% NH$_4$H$_2$PO$_4$ | 5.07 | 230 | 23.1 | 0.0092 |
| 3 | 25 | 25 | 50 | 1,250 | 95 | 1% NH$_4$H$_2$PO$_4$ | 3.48 | 185 | 20.6 | 0.0016 |
| 4 | 25 | 25 | 50 | 1,250 | 25 | 10% NH$_4$H$_2$PO$_4$ | 4.68 | 190 | 24.5 | 0.083 |
| 5 | 30 | 30 | 40 | 1,150 | 95 | 0.1% NH$_4$H$_2$PO$_4$ | 6.14 | 272 | 15.5 | 0.010 |
| 6 | 30 | 30 | 40 | 1,150 | 25 | 1% NH$_4$H$_2$PO$_4$ | 7.08 | 319 | 17.2 | 0.015 |
| 7 | 30 | 30 | 40 | 1,150 | 95 | 1% NH$_4$H$_2$PO$_4$ | 6.14 | 258 | 16.5 | 0.0078 |
| 8 | 34 | 33 | 33 | 1,150 | 95 | 0.1% NH$_4$H$_2$PO$_4$ | 3.04 | 157 | 9.0 | 0.040 |
| 9 | 34 | 33 | 33 | 1,150 | 25 | 1% NH$_4$H$_2$PO$_4$ | 3.92 | 155 | 11.6 | 0.18 |
| 10 | 34 | 33 | 33 | 1,150 | 95 | 1% NH$_4$H$_2$PO$_4$ | 3.59 | 150 | 10.4 | 0.035 |
| 11 | 34 | 33 | 33 | 1,150 | 95 | 10% NH$_4$H$_2$PO$_4$ | 2.46 | 152 | 6.0 | 0.065 |
| 12 | 34 | 33 | 33 | 1,150 | 95 | 10% (NH$_4$)$_2$HPO$_4$ | 2.53 | 155 | 6.3 | 0.074 |

The anodized porous sintered bodies are put into containers filled with an electrolytic solution such as phosphoric acid, or ammonium phosphate solution and sealed with a plug to prevent the electrolytic solution from leaking. Construction of a wet-type electrolytic capacitor is shown in FIG. 1.

It has been discovered according to the invention that the dielectric oxide films formed on the alloy of titanium, zirconium and aluminum can form a so-called solid electrolytic capacitor superior in leakage factor when combined with a manganese dioxide layer integrated thereon.

Said manganese dioxide layer can be applied to said dielectric oxide film in a manner well-known in a prior solid electrolytic capacitor preparation technique. For example, an alloy according to the invention is anodically oxidized in a manner similar to that mentioned above and is immersed in a manganese nitrate solution and is heated about 250° C. to be provided with a manganese oxide layer.

Said manganese dioxide layer is coated with a carbon film layer by applying carbon ink containing colloidal carbon. Finally a silver paint as a counter electrode is applied to said carbon film layer in a conventional method.

Table 5 shows electrical properties of solid electrolytic capacitors which have porous sintered anode.

The capacitance and the dissipation factor are measured

TABLE 3

| Composition (at percent) | | Capacitance | | D.F. (percent) | Leakage factor ($\mu a./\mu f.\cdot v.$) |
| --- | --- | --- | --- | --- | --- |
| Ti | Al | $\mu f.$/pellet | $\mu f./cm.^3$ | | |
| 70 | 30 | 7.36 | 425 | 26.5 | 2.4 |
| 60 | 40 | 7.48 | 292 | 13.6 | 0.50 |
| 50 | 50 | 6.65 | 322 | 10.6 | 0.11 |

TABLE 5

| No. | Composition at. (percent) | | | Capacitance ($\mu f.$) | D.F. (percent) | Leakage factor ($\mu a./\mu f.\cdot v.$) |
| --- | --- | --- | --- | --- | --- | --- |
| | Ti | Zr | Al | | | |
| 1 | 25 | 25 | 50 | 2.68 | 13.6 | 0.020 |
| 2 | 34 | 33 | 33 | 3.97 | 14.7 | 0.28 |
| 3 | 34 | 33 | 33 | 3.98 | 7.0 | 0.0042 | using a capacitance bridge. The leakage current is measured by applying a DC voltage of 16 v. across the two leads.

So-called solid electrolytic capacitors comprising a porous anode have a leakage factor of about 0.004 to 0.5 $\mu A./\mu F.V.$ at an applied voltage of 16v. in the composition range according to the present invention.

Furthermore, a leakage factor of a solid electrolytic capacitor having an electrode made of the ternary alloy 34 at. percent titanium, 33 at. percent zirconium and 33 at. percent aluminum reaches 0.0012 $\mu A./\mu F.v.$ at 25 v. when the electrode formed at 75 v. is prepared by preventing fully from gas element absorption during both alloy production and sintering processes.

It is apparent from the foregoing that the titanium-aluminum alloy and the titanium-zirconium-aluminum alloy of this invention provide extremely satisfactory results in electrolytic capacitor applications. Furthermore, titanium, zirconium and aluminum are less expensive than tantalum and therefore the capacitors of this invention will be manufactured at lower cost.

What I claim is:

1. An electrolytic capacitor comprising, in combination, a pair of electrodes and electrolyte means in contact with both electrodes, at least one of said electrodes comprising an alloy consisting essentially of the film forming metals stated in the diagram of FIG. 3 and within the proportions defined by the polygonal area ABCDEFG of the diagram of said figure, said one electrode having a dielectric metal oxide film formed thereon.

2. An electrolytic capacitor according to claim 1, wherein said one electrode consists essentially of the film forming metals defined by lines connecting points CHI of the diagram of FIG. 3.

3. An electrolytic capacitor according to claim 1, wherein said electrolytic means comprises manganese dioxide in contact with said pair of electrodes.

4. An electrolytic capacitor according to claim 1, wherein said electrolytic means comprises an aqueous solution of ammonium phosphate.

UNITED STATES PATENT OFFICE
CERTIFICATE OF CORRECTION

Patent No. 3,599,053　　　　　　　　　Dated August 10, 1971

Inventor(s) Koreaki Nakata and Yoshio Iida

It is certified that error appears in the above-identified patent and that said Letters Patent are hereby corrected as shown below:

Change the order of inventors as follows:

Inventors Koreaki Nakata,
            Nishinomiya-shi;
            Yoshio Iida
            Osaka-fu, both of,
            Japan Table 1, Composition D and Table 2, Example 9, change " 45　　10　　45 " to -- 10　　45　　45 --

Table 2, Example 1, "10　45　45" should read -- 20 10 70 --.

Signed and sealed this 6th day of June 1972.

(SEAL)
Attest:

EDWARD M. FLETCHER, JR.　　　　　　ROBERT GOTTSCHALK
Attesting Officer　　　　　　　　　　Commissioner of Patents